US012791355B2

(12) United States Patent
Schaefer

(10) Patent No.: US 12,791,355 B2
(45) Date of Patent: Nov. 10, 2026

(54) SYSTEM AND METHOD FOR ESTIMATING A LINE FOR A BOUNDARY LINE

(71) Applicant: Toyota Jidosha Kabushiki Kaisha, Toyota (JP)

(72) Inventor: Alexander Christoph Schaefer, Fremont, CA (US)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 156 days.

(21) Appl. No.: 18/427,950

(22) Filed: Jan. 31, 2024

(65) Prior Publication Data

US 2025/0244144 A1 Jul. 31, 2025

(51) Int. Cl.
*G01C 21/00* (2006.01)

(52) U.S. Cl.
CPC ..... *G01C 21/3867* (2020.08); *G01C 21/3819* (2020.08)

(58) Field of Classification Search
None
See application file for complete search history.

(56) References Cited

U.S. PATENT DOCUMENTS

| | | | | |
|---|---|---|---|---|
| 8,396,325 | B1 | 3/2013 | Kwatra et al. | |
| 8,994,822 | B2 | 3/2015 | Smitherman et al. | |
| 12,586,318 | B2 * | 3/2026 | Jiao | G06T 17/05 |
| 2008/0034074 | A1 * | 2/2008 | Becker | H04L 45/14 709/223 |
| 2021/0375012 | A1 * | 12/2021 | Mochizuki | G01C 21/20 |
| 2022/0090939 | A1 * | 3/2022 | Pfeifle | B60K 35/85 |
| 2023/0016335 | A1 * | 1/2023 | Williams | B60W 10/20 |
| 2023/0194298 | A1 * | 6/2023 | Hong | G01C 21/3867 701/450 |
| 2025/0002048 | A1 * | 1/2025 | Zeng | B60W 60/0027 |

OTHER PUBLICATIONS

Alexei N. Skourikhine "Proximity graph analysis for linear networks extraction from high-resolution satellite imagery", Proc. SPIE 6235, Signal Processing, Sensor Fusion, and Target Recognition XV, 62351C (May 17, 2006); https://doi.org/10.1117/12.669536 (Year: 2006).*

Visvalingam, M., & Whelan, J. C. (2016). Implications of Weighting Metrics for Line Generalization with Visvalingamâs Algorithm. Cartographic Journal, 53(3), 253â267. https://doi.org/10.1080/00087041.2016.1149906 (Year: 2016).*

Karduni, A., Kermanshah, A. & Derrible, S. A protocol to convert spatial polyline data to network formats and applications to world urban road networks. Sci Data 3, 160046 (2016). https://doi.org/10.1038/sdata.2016.46 (Year: 2016).*

Lu et al., "Graph-Embedded Lane Detection," IEEE Transactions on Image Processing, 2021, pp. 2977-2988.

Shi et al., "Lane-Level Road Network Construction Based on Street-View Images," IEEE Journal of Selected Topics in Applied Earth Observations and Remote Sensing, 2022, pp. 4744-4754.

* cited by examiner

*Primary Examiner* — Faris S Almatrahi
*Assistant Examiner* — Selena M Jin
(74) *Attorney, Agent, or Firm* — Christopher G. Darrow; Darrow Mustafa PC

(57) ABSTRACT

Systems, methods, and other embodiments described herein relate to estimating a line for a boundary line. In one example, a system includes a processor and a memory having instructions that, when executed by the processor, cause the processor to generate a graph from key points of a boundary line and determine the longest-shortest path within the graph. The longest-shortest path represents a line estimate of the boundary line.

20 Claims, 6 Drawing Sheets

SYSTEM AND METHOD FOR ESTIMATING A LINE FOR A BOUNDARY LINE

TECHNICAL FIELD

The subject matter described herein relates, in general, to systems and methods for estimating a line for a boundary line.

BACKGROUND

Electronic maps, especially electronic maps used by autonomous and semi-autonomous vehicles, may be constructed by utilizing sensor data collected from vehicles traveling on roadways. In particular, sensor data related to the precise location of lanes, lane boundaries, and the like are of particular importance when generating electronic maps, as this information will be utilized to control autonomous and/or semi-autonomous vehicles with reduced and/or no human input. However, the estimating of the locations of lanes, lane boundaries, and the like when generating electronic maps is computationally intensive and laborious.

SUMMARY

In one embodiment, a system includes a processor and a memory that is in communication with the processor. The memory includes instructions that, when executed by the processor, cause the processor to generate a graph from key points of a boundary line and determine the longest-shortest path within the graph. The longest-shortest path represents a line estimate of the boundary line.

In another embodiment, a method includes the steps of generating a graph from key points of a boundary line and determining the longest-shortest path within the graph. Like before, the longest-shortest path represents a line estimate of the boundary line.

In yet another embodiment, a non-transitory computer-readable medium includes instructions that, when executed by a processor, cause the processor to generate a graph from key points of a boundary line and determine the longest-shortest path within the graph. Again, the longest-shortest path represents a line estimate of the boundary line.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Disclosed are systems and methods for estimating a line for a boundary line. Moreover, in one example, a graph is generated from key points of the boundary line using sensor information. Generally, the key points represent detections of the boundary line that have been derived from the sensor data. After generating the graph, the longest-shortest path is determined within the graph. This longest-shortest path represents the line estimate for the boundary line. The longest-shortest path may be further refined to generate the line estimate, such as undergoing a smoothening operation.

Figure 1:
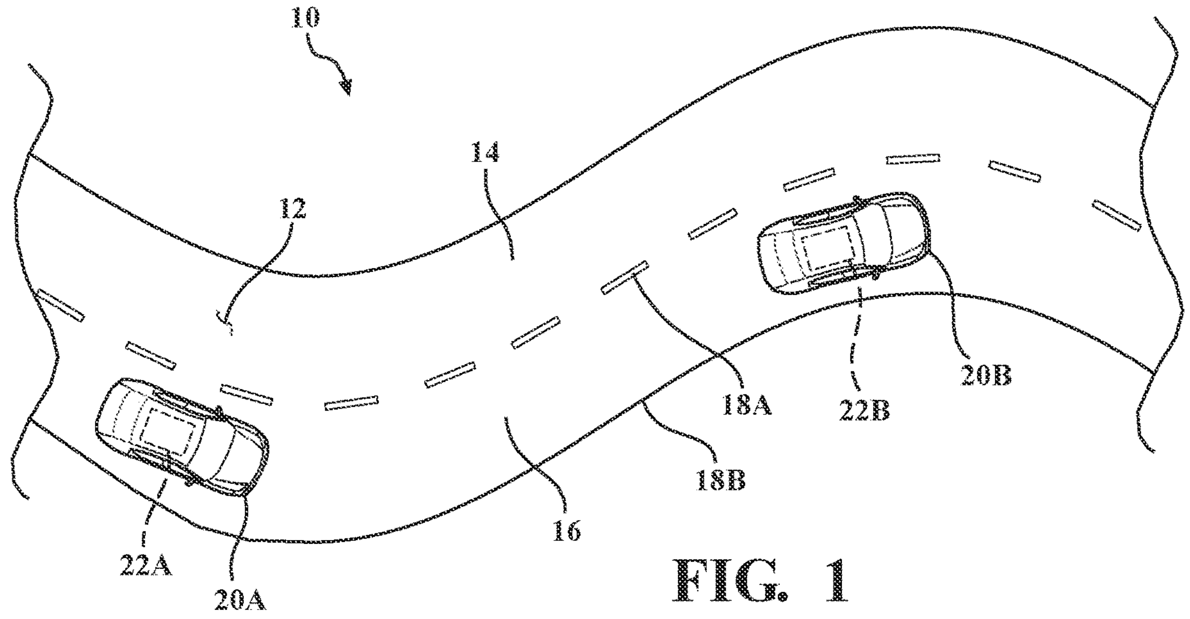
FIG. 1 illustrates vehicles collecting information from sensors for generating key points that will be used to estimate lines of a boundary line.

Referring to FIG. 1, illustrated is a scenario 10 wherein a roadway 12 includes lanes 14 and 16. It should be understood that the roadway 12 and the number of lanes shown in the roadway are just an example and can vary considerably. For example, the roadway 12 can include more or fewer lanes, such as a one-lane road, multilane highway, rural road, bike lane, pedestrian path, unpaved road, etc.

Here, the lane 16 includes boundary lines 18A and 18B. In this example, the boundary line 18A may be a painted boundary line that may be shared with another lane, such as the lane 14. The boundary line 18B may also be a painted boundary line indicating the other boundary of the lane 14. It should be understood that the boundary lines 18A and 18B can take any one of a number of different forms and do not necessarily need to be painted lane boundaries. The lane boundaries can vary considerably and can include a number of different combinations.

In some cases, instead of painted lane boundaries, boundaries may be indicated by the presence of curbs, edges of the roadway, such as where asphalt/concrete ends and dirt/grass/etc. begins, or by historical and/or logical interpretations, such as the understanding that the middle of a dirt road forms a boundary between two different lanes. No matter the case, as will be explained in this description, the systems and methods can estimate lines that indicate these lane boundaries.

Also shown are vehicles 20A and 20B traveling upon the roadway 12 in the lane 16. Here, the vehicles 20A and 20B may be equipped with sensor systems 22A and 22B, respectively, that may allow the vehicles 20A and 20B to collect sensor data that can be utilized to determine the location of the boundary lines 18A and 18B of the lane 16. It should also be understood that the sensor data collected by the sensor systems 22A and 22B may also be able to observe lane boundaries of lanes that the vehicles 20A and 20B are not traveling upon, simply by having an appropriate field of view that allows observation of bordering or even far away lane boundaries of different lanes.

The sensor systems 22A and/or 22B can vary considerably from application to application. Generally, the sensor systems 22A and/or 22B include sensors that can collect information that can be used to disseminate detected lane boundaries. As such, the sensor systems 22A and/or 22B can include any appropriate sensor or sensors to achieve this goal, such as camera(s), radar sensor(s), sonar sensor(s), light detection and ranging (LIDAR) sensors, etc.

In this example, the vehicles 20A and 20B are shown to be automobiles. Still, it should be understood that the vehicles 20A and 20B can take a number of different forms so long as they are able to collect sensor data regarding lane boundaries. For example, instead of being automobiles, the vehicles 20A and/or 20B could be any moving or nonmoving system that can collect sensor data regarding lane boundaries. As such, nonmoving systems can include road structures that are equipped with appropriate sensor systems that can capture boundary line information. Moving systems can include other types of automobiles, such as trucks, tractor-trailers, etc., but also tractors or other agricultural equipment, aerial drones, satellites, robots, motorcycles, bicycles, or even handheld sensor systems, such as camera information from the mobile phones of pedestrians.

Figure 2:
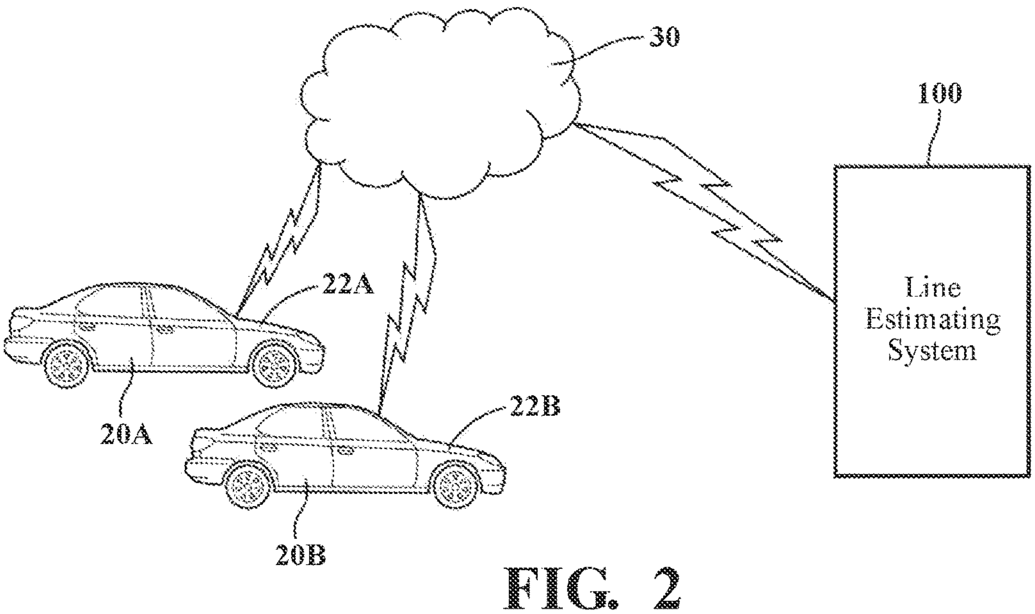
FIG. 2 illustrates a high-level overview of a system for estimating lines of lane boundaries receiving sensor information from vehicles.

As mentioned before, key points that indicate the location of the boundary line are generated from the sensor information. The key points may be generated from the device collecting the sensor information, such as the vehicles 20A and/or 20B, and/or the sensor data may be transmitted and processed by another device that generates the key points. A full description of the key points will be given later in this description. Referring to FIG. 2, regardless of how the key points are generated, these key points are then sent to a line estimating system 100. In this example, the vehicles 20A and 20B wirelessly transmit sensor information and/or key points derived from the sensor information to the line estimating system 100 via a network 30. In the case where sensor data (but not key points) are sent to the line estimating system 100 from the vehicles 20A and 20B, the line estimating system 100 generates the key points from the sensor data.

Figure 3:
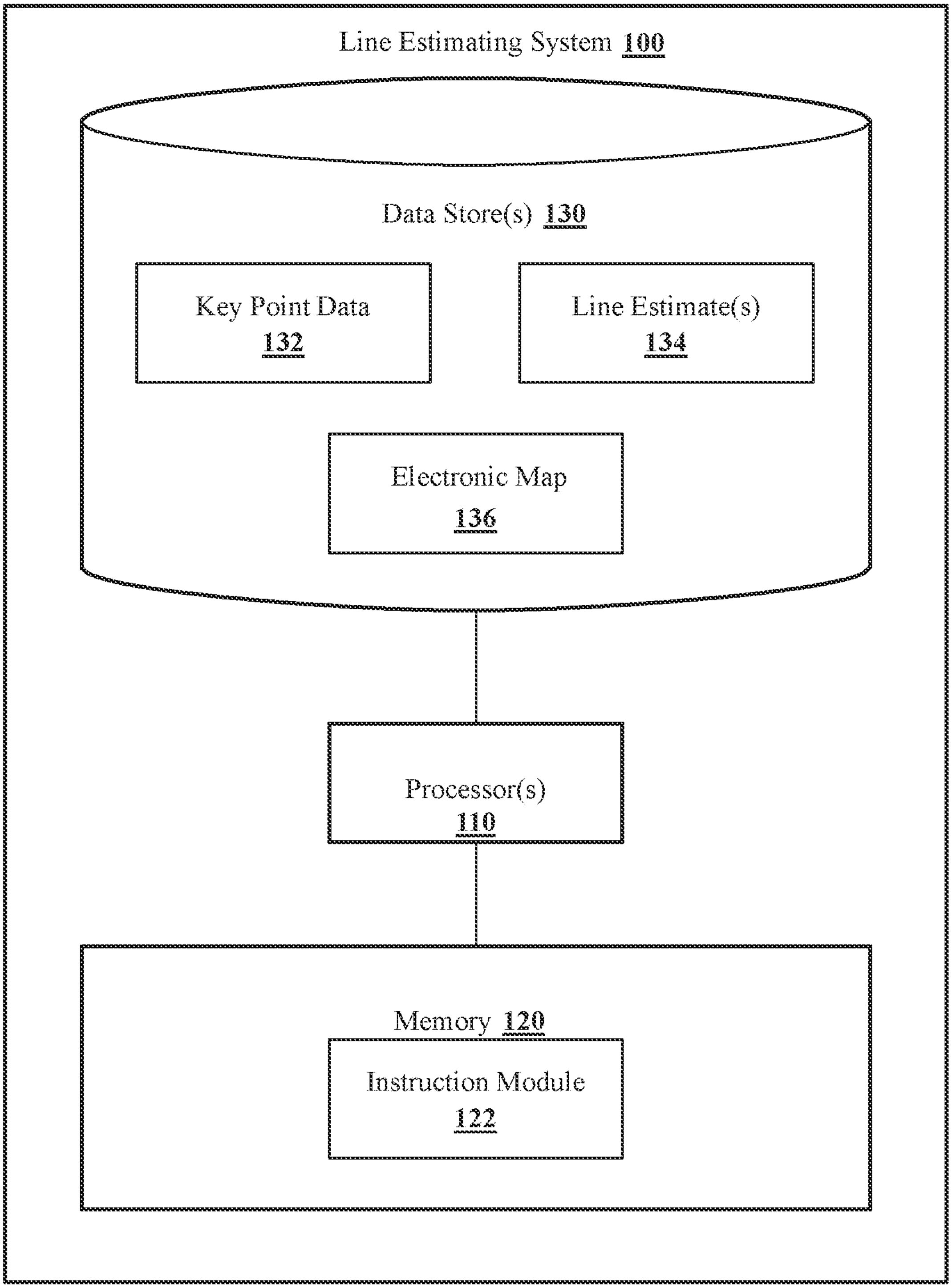
FIG. 3 illustrates a more detailed view of a system for estimating lines of lane boundaries.

The line estimating system 100 is configured to generate line estimates of lane boundaries utilizing the key points. However, before describing this process, a brief description of the line estimating system 100 will be given. As best shown in FIG. 3, the line estimating system 100 includes one or more processor(s) 110. Accordingly, the processor(s) 110 may be a part of the line estimating system 100, or the line estimating system 100 may access the processor(s) 110 through a data bus or another communication path. In one or more embodiments, the processor(s) 110 is an application-specific integrated circuit that is configured to implement functions associated with an instruction module 122. In general, the processor(s) 110 is an electronic processor, such as a microprocessor, which is capable of performing various functions as described herein. In one embodiment, the line estimating system 100 includes a memory 120 that stores the instruction module 122. The memory 120 is a random-access memory (RAM), read-only memory (ROM), a hard disk drive, a flash memory, or other suitable memory for storing the instruction module 122. The instruction module 122 is, for example, computer-readable instructions that, when executed by the processor(s) 110, cause the processor (s) 110 to perform the various functions disclosed herein.

Furthermore, in one embodiment, the line estimating system 100 includes one or more data store(s) 130. The data store(s) 130 is, in one embodiment, an electronic data structure such as a database that is stored in the memory 120 or another memory and that is configured with routines that can be executed by the processor(s) 110 for analyzing stored data, providing stored data, organizing stored data, and so on. Thus, in one embodiment, the data store(s) 130 stores data used by the instruction module 122 in executing various functions. In one embodiment, the data store(s) 130 includes key point data 132, line estimate(s) 134, and an electronic map 136, along with, for example, other information that is used by the instruction module 122. As will be described in greater detail later, the key point data 132 includes key points generated from collected sensor data, the line estimate (s) 134 are the line estimates of lane boundaries, and the electronic map 136 may be an electronic map that is created or modified utilizing the line estimate(s) 134.

Figure 4A:
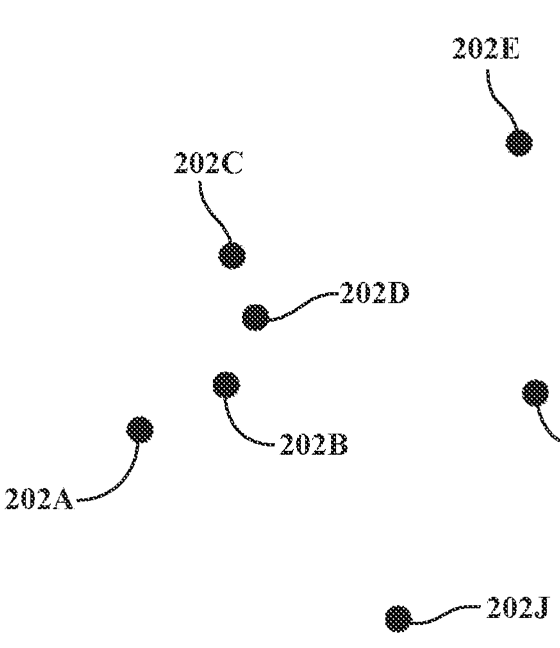
FIGS. 4A-4F illustrate, at different steps, key points being utilized to estimate lines of a boundary line.

As mentioned before, the instruction module 122 includes instructions for performing any of the methods disclosed herein, including generating line estimates. To better understand how line estimates are generated, reference is made to FIGS. 4A-4F. Referring to FIG. 4A, illustrated are key points 202A-202J. The key points 202A-202J may be generated utilizing sensor data collected from vehicles or other entities that travel on or can sense lane boundaries of one or more roads. In this example, the key points 202A-202J are points indicating the presence of the boundary line. For example, the key points 202A-202J could be key points that represent the boundary line 18B of the lane 16 of FIG. 1.

The key points 202A-202J generally include positioning information that identifies the position of the key points and, thereby, the detected lane boundaries. However, due to noise, errors, changing environmental conditions, sensor quality, or other variables, the key points 202A-202J may not precisely identify the location of the boundary line. As such, the systems and methods described herein utilize key points, such as the key points 202A-202J, to estimate a lane line in a way that is generally both accurate and computationally efficient.

In addition to location information, the key points 202A-202J can also include other information as well, such as metadata that includes details such as the source of sensor data, geographical location in terms of coordinates, lane line color, lane line type, and environmental conditions such as elevation levels, light levels, humidity levels, temperature levels, and/or precipitation levels.

Figure 4B:
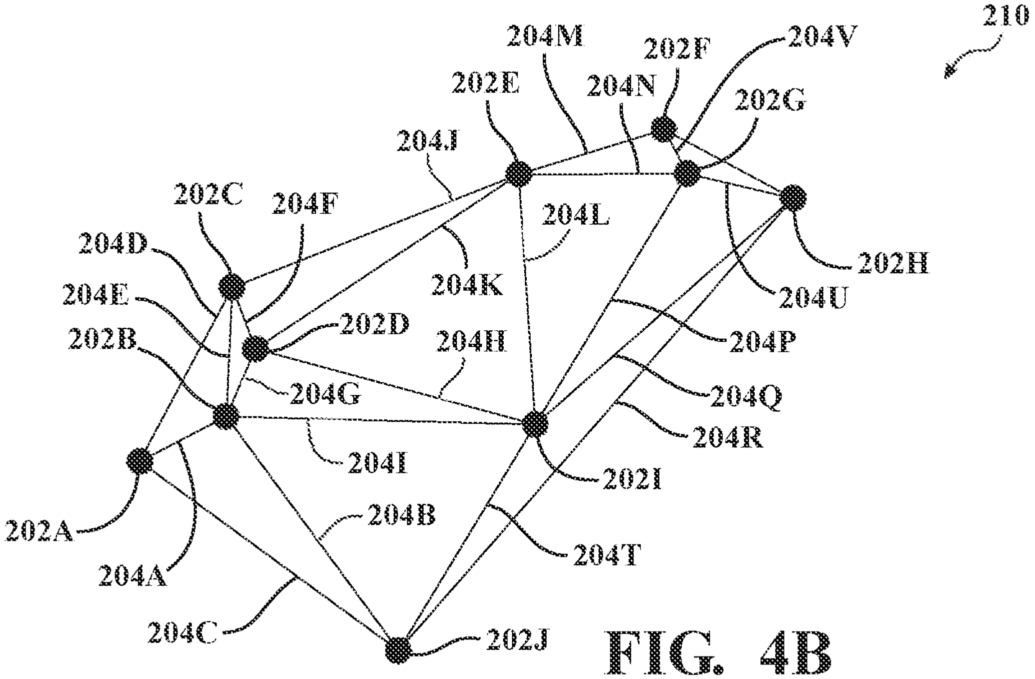
Figure 4C:
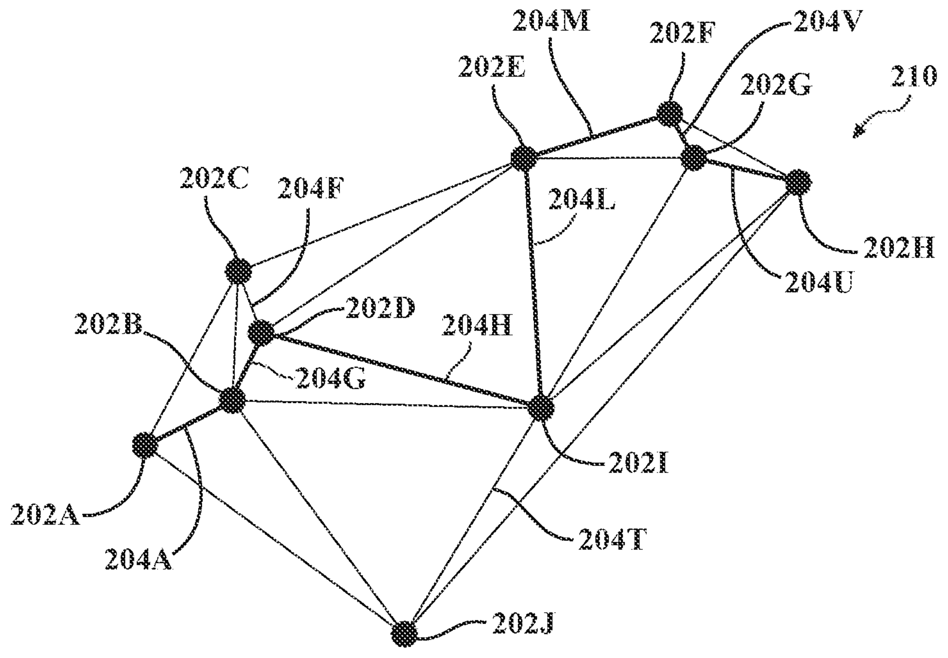
Figure 4D:
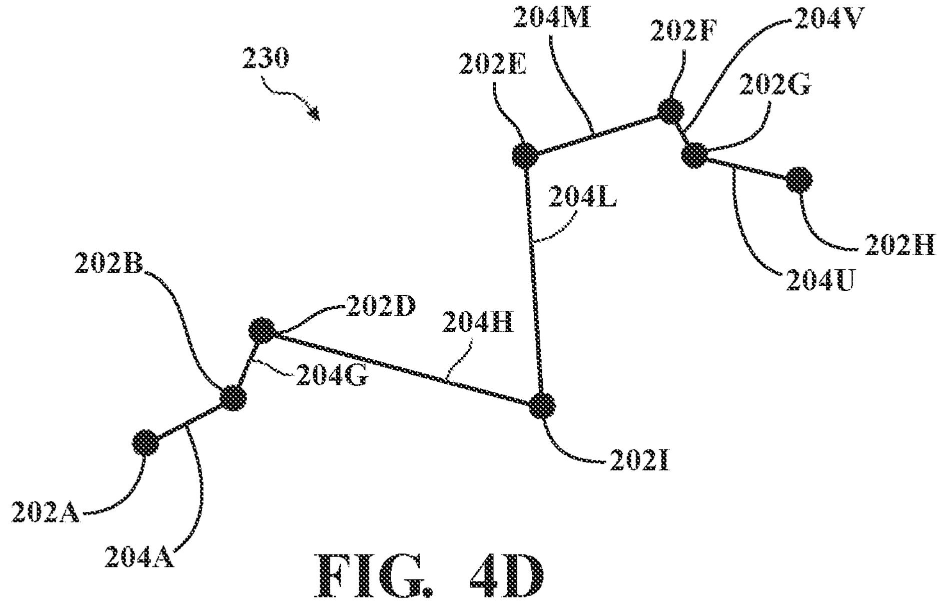
Figure 4E:
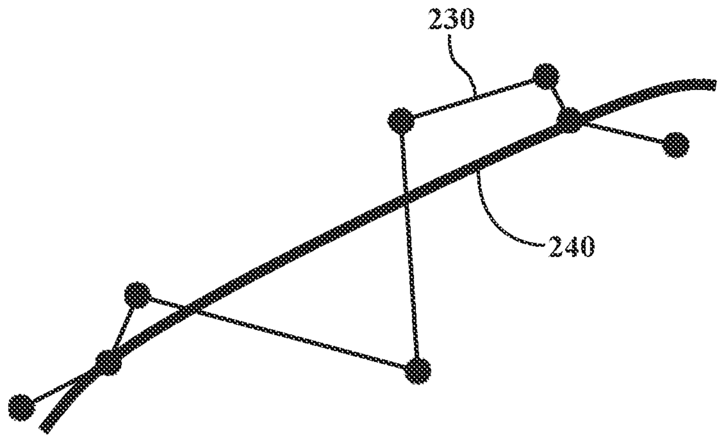
Figure 4F:
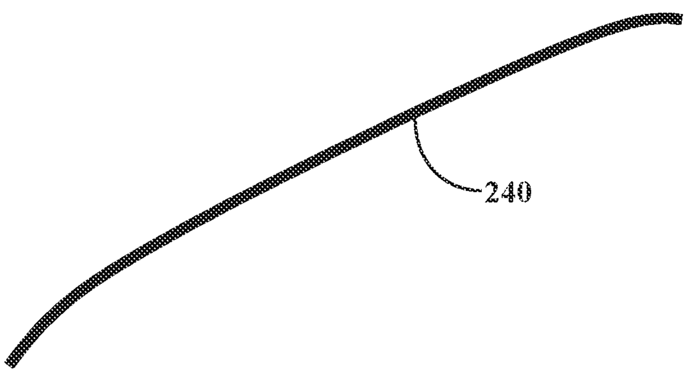

Upon receiving and/or generating the key points 202A-202J, the instructions stored in the instruction module 122 cause the processor(s) 110 to generate a graph 210 of the key points 202A-202J, as best shown in FIG. 4B. Any one of a number of different methodologies can be utilized to generate the graph 210 from the key points 202A-202J. In this example, the processor(s) 110 generates the graph 210 utilizing a Delaunay triangulation process. A Delaunay triangulation, for a given set $\{p_i\}$ of discrete points $p_i$ in general position, is a triangulation such that no point $p_i$ is inside the circumcircle of any triangle in the Delaunay triangulation. Delaunay triangulations maximize the minimum of all the angles of the triangles in the triangulation. As such, upon completing the Delaunay triangulation process, the graph 210 includes segments 204A-204V having varying lengths. The graph 210 may be a weighted graph having weights based on Euclidean distances between nodes (key points 202A-202J).

Once the graph 210 is completed, the instructions stored in the instruction module 122 cause the processor(s) 110 to determine the longest-shortest path 230 within the graph 210. Moreover, referring to FIGS. 4C and 4D, the longest-shortest path 230 is determined within the graph 210. The longest-shortest path 230 is the longest possible shortest path among all pairs of nodes (key points 202A-202J) in a graph, such as the graph 210. As such, in this example, the longest-shortest path 230 includes segments 204A, 204G, 204H, 204L, 204M, 204V, and 204U. The longest-shortest path 230 is essentially the line estimate for the boundary line. Moreover, assuming the boundary line is the boundary line 18B of FIG. 1, the longest-shortest path 230 is the estimate of that boundary line.

The longest-shortest path 230 may be further refined, such as line simplification techniques like Visvalingam or split-and-merge. For example, referring to FIGS. 4E and 4F, the instructions stored in the instruction module 122, cause the processor(s) 110 to refine the longest-shortest path 230 to generate the line estimate 240. Here, the longest-shortest path 230 has been refined utilizing a smoothening process that smoothens the longest-shortest path 230 to generate the final line estimate 240. Any refining and/or smoothening methodology may be applied to smoothen out the longest-shortest path 230, such as Visvalingam, split-and-merge, moving average, exponential smoothing, weighted moving average, kernel smoothing, polynomial regression smoothing, and the like.

Once the line estimate 240 has been generated and finalized, the line estimate 240 can be used for a number of different purposes. In particular, the line estimate 240 can be utilized in the creation or updating of an electronic map, such as the electronic map 136 of FIG. 3. For example, the instructions stored in the instruction module 122 cause the processor(s) 110 to either update a preexisting boundary line of the electronic map 136 using the line estimate 240 and/or create a boundary line for the electronic map 136.

Figure 5:
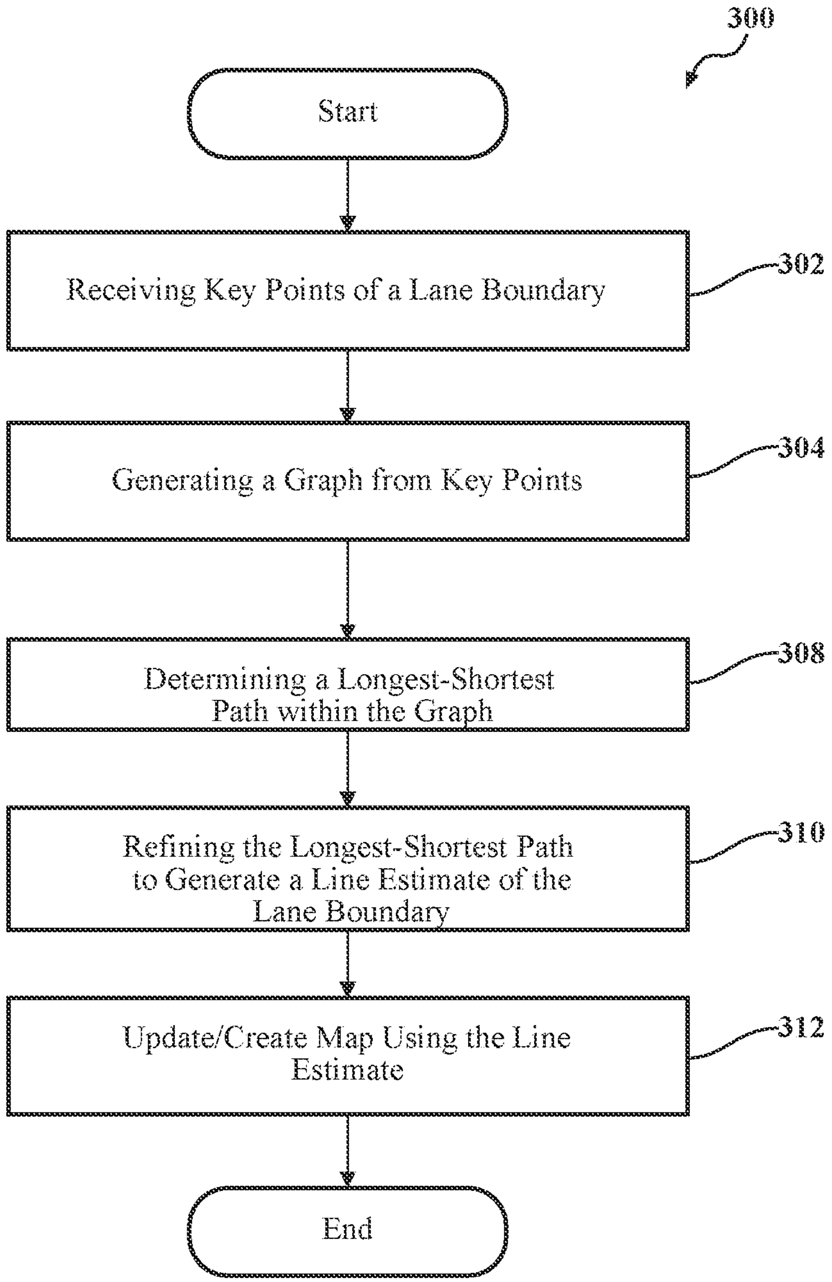
FIG. 5 illustrates a method for estimating lines of lane boundaries.

Referring to FIG. 5, a method 300 for estimating a line of a boundary line is shown. The method 300 will be described from the viewpoint of the line estimating system 100 of FIG. 3. However, it should be understood that this is just one example of implementing the method 300. While method 300 is discussed in combination with the line estimating system 100, it should be appreciated that the method 300 is not limited to being implemented within the line estimating system 100 but is instead one example of a system that may implement the method 300.

In step 302, the instructions stored within the instruction module 122 may, when executed by the processor(s) 110, cause the processor to receive key points of the boundary line, such as key points 202A-202J shown in FIG. 4A. The key points 202A-202J may be generated from sensor data collected by vehicles, such as the vehicles 20A and 20B. The key points 202A-202J may be generated from the sensor data by the vehicles 20A and 20B, the line estimating system 100, or some other system.

In step 304, the instructions stored in the instruction module 122 cause the processor(s) 110 to generate a graph 210 of the key points 202A-202J, as best shown in FIG. 4B. Any one of a number of different methodologies can be utilized to generate the graph 210 from the key points 202A-202J, such as the Delaunay triangulation process previously described.

In step 308, the instructions stored in the instruction module 122 cause the processor(s) 110 to determine the longest-shortest path 230 within the graph 210. Moreover, referring to FIGS. 4C and 4D, the longest-shortest path 230 is determined within the graph 210. The longest-shortest path 230 is the longest possible shortest path among all pairs of nodes (key points 202A-202J) in a graph, such as the graph 210. As such, in this example, the longest-shortest path 230 includes segments 204A, 204G, 204H, 204L, 204M, 204V, and 204U. The longest-shortest path 230 is essentially the line estimate for the boundary line.

In step 310, the instructions stored in the instruction module 122 cause the processor(s) 110 to refine the longest-shortest path 230 to generate the line estimate 240. Here, the longest-shortest path 230 has been refined utilizing a smoothening process that smoothens the longest-shortest path 230 to generate the final line estimate 240.

In step 312, the instructions stored in the instruction module 122 cause the processor(s) 110 to update and/or create an electronic map, such as the electronic map 136 using the line estimate 240. For example, the instructions stored in the instruction module 122 cause the processor(s) 110 to either update a preexisting boundary line of the electronic map 136 using the line estimate 240 and/or create a boundary line for the electronic map 136.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-5, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components, and/or processes described above can be realized in hardware or a combination of hardware and software. They can be realized in a centralized fashion in one processing system or in a distributed fashion where different elements are spread across several interconnected processing systems. Any processing system or another apparatus adapted for carrying out the methods described herein is suited. A typical combination of hardware and software can be a processing system with computer-usable program code that, when being loaded and executed, controls the processing system such that it carries out the methods described herein. The systems, components, and/or processes also can be embedded in a computer-readable storage, such as a computer program product or other data programs storage device, readable by a machine, tangibly embodying a program of instructions executable by the machine to perform methods and processes described herein. These elements can also be embedded in an application product, which comprises all the features enabling the implementation of the methods described herein and which, when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Generally, modules, as used herein, include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++, or the like, and conventional procedural programming languages, such as the "C" programming language or similar programming languages. The program code may execute entirely on the user's computer, partly on the user's computer, as a stand-alone software package, and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC, or ABC).

Aspects herein can be embodied in other forms without departing from the spirit or essential attributes thereof. Accordingly, reference should be made to the following claims rather than to the preceding specification, indicating the scope hereof.

What is claimed is:

1. A system comprising:

a processor;

a memory in communication with the processor, the memory having instructions that, when executed by the processor, cause the processor to:

generate a graph from key points of a boundary line, the key points being generated from sensor data collected by vehicles traveling on a road having the boundary line, each of the key points including metadata indicating an environmental condition associated with the key point;

determine a longest-shortest path within the graph, wherein the longest-shortest path is a longest possible shortest path among all pairs of key points of the boundary line;

refine the longest-shortest path using at least one of Visvalingam line simplification and split-and-merge line simplification to generate a line estimate of the boundary line; and modify an electronic map to incorporate the line estimate of the boundary line, wherein the electronic map is used to navigate at least one autonomous or semi-autonomous vehicle.

2. The system of claim 1, wherein the memory further includes instructions that, when executed by the processor, cause the processor to generate the graph of the key points using a Delaunay triangulation process.

3. The system of claim 1, wherein the graph is a weighted graph having weights based on Euclidean distances between nodes.

4. The system of claim 1, wherein the memory further includes instructions that, when executed by the processor, cause the processor to perform at least one of:

update a preexisting boundary line of the electronic map using the line estimate; and create a new boundary line of the electronic map using the line estimate.

5. The system of claim 1, wherein each key point includes metadata indicating a source of sensor data and lane line type associated with the key point.

6. The system of claim 1, wherein the environmental condition comprises at least one of an elevation level, a light level, a humidity level, a temperature level, and a precipitation level.

7. The system of claim 1, wherein the boundary line comprises at least one of a painted boundary line, a curb, and an edge of a roadway.

8. A method comprising steps of:

generating a graph from key points of a boundary line, the key points being generated from sensor data collected by vehicles traveling on a road having the boundary line, each of the key points including metadata indicating an environmental condition associated with the key point;

determining a longest-shortest path within the graph, wherein the longest-shortest path is a longest possible shortest path among all pairs of key points of the boundary line;

refining the longest-shortest path using at least one of Visvalingam line simplification and split-and-merge line simplification to generate a line estimate of the boundary line; and modifying an electronic map to incorporate the line estimate of the boundary line, wherein the electronic map is used to navigate at least one autonomous or semi-autonomous vehicle.

9. The method of claim 8, further comprising the step of generating the graph of the key points using a Delaunay triangulation process.

10. The method of claim 8, wherein the graph is a weighted graph having weights based on Euclidean distances between nodes.

11. The method of claim 8, further comprising at least one of the following steps:

updating a preexisting boundary line of the electronic map using the line estimate; and creating a new boundary line of the electronic map using the line estimate.

12. The method of claim 8, wherein each key point includes metadata indicating a source of sensor data and lane line type associated with the key point.

13. The method of claim 8, wherein the environmental condition comprises at least one of an elevation level, a light level, a humidity level, a temperature level, and a precipitation level.

14. The method of claim 8, wherein the boundary line comprises at least one of a painted boundary line, a curb, and an edge of a roadway.

15. A non-transitory computer readable medium having instructions that, when executed by a processor, cause the processor to:

generate a graph from key points of a boundary line, the key points being generated from sensor data collected by vehicles traveling on a road having the boundary line, each of the key points including metadata indicating an environmental condition associated with the key point;

determine a longest-shortest path within the graph, wherein the longest-shortest path is a longest possible shortest path among all pairs of key points of the boundary line;

refine the longest-shortest path using at least one of Visvalingam line simplification and split-and-merge line simplification to generate a line estimate of the boundary line; and modify an electronic map to incorporate the line estimate of the boundary line, wherein the electronic map is used to navigate at least one autonomous or semi-autonomous vehicle.

16. The non-transitory computer readable medium of claim 15, further including instructions that, when executed by the processor, cause the processor to generate the graph of the key points using a Delaunay triangulation process.

17. The non-transitory computer readable medium of claim 15, wherein the graph is a weighted graph having weights based on Euclidean distances between nodes.

18. The non-transitory computer readable medium of claim 15, further including instructions that, when executed by the processor, cause the processor to perform at least one of:

update a preexisting boundary line of the electronic map using the line estimate; and create a new boundary line of the electronic map using the line estimate.

19. The non-transitory computer readable medium of claim 15, wherein each key point includes metadata indicating a source of sensor data and lane line type associated with the key point.

20. The non-transitory computer readable medium of claim 15, wherein the environmental condition comprises at least one of an elevation level, a light level, a humidity level, a temperature level, and a precipitation level.

* * * * *